United States Patent [19]
Tapp

[11] Patent Number: 5,472,168
[45] Date of Patent: Dec. 5, 1995

[54] TEMPLATE APPARATUS AND METHOD FOR MANUFACTURING REPLACEMENT WINDSHIELDS

[75] Inventor: Steven L. Tapp, Midvale, Utah

[73] Assignee: Safelite Glass Corporation, Columbus, Ohio

[21] Appl. No.: 992,160

[22] Filed: Dec. 17, 1992

[51] Int. Cl.[6] ............................. B29C 33/22; G01B 5/20
[52] U.S. Cl. ........................ 249/139; 33/561.3; 264/220; 425/12
[58] Field of Search .................... 425/11, 12; 264/36, 264/220, 225; 249/139; 33/561.3, 561.2, 561.1

[56] References Cited

U.S. PATENT DOCUMENTS

| | | | |
|---|---|---|---|
| D. 136,978 | 1/1944 | Tomasini | 33/561.1 |
| 365,873 | 7/1887 | Spence et al. | 33/561.1 |
| 1,257,200 | 2/1918 | Durkee | 33/561.3 |
| 1,946,377 | 2/1934 | Wynd | 33/175 |
| 2,091,885 | 8/1937 | Saidel | 425/11 |
| 2,101,478 | 12/1937 | Reich | 33/561.3 |
| 2,212,739 | 8/1940 | Human | 33/561.3 |
| 2,285,582 | 6/1942 | Human | 33/561.3 |
| 2,487,944 | 11/1949 | Pressman | 33/561.3 |
| 2,896,255 | 7/1959 | Doherty | 425/11 |
| 3,140,328 | 7/1964 | Simms | 425/11 |
| 3,182,354 | 5/1965 | Berrill | 425/11 |
| 3,861,049 | 1/1975 | Muller | 33/175 |
| 4,800,054 | 1/1989 | Roestenberg | 425/11 |
| 4,916,173 | 4/1990 | Otloski | 521/54 |

*Primary Examiner*—Michael W. Ball
*Assistant Examiner*—Daniel J. Stemmer
*Attorney, Agent, or Firm*—Berne S. Broadbent; Gary D. E. Pierce

[57] ABSTRACT

A template apparatus and method for manufacturing replacement windshields for automobiles. The template apparatus comprises a rigid frame, a plurality of support bars extending from the rigid frame, an epoxy splash, means for joining the rigid frame to the epoxy splash, means for maintaining the rigid frame to the epoxy splash, means for introducing the epoxy splash into the window well of the automobile and means for simulating the thickness of a glass sealant for introduction into the window well of the automobile before the final replacement windshield is inserted therein. The rigid frame engages the epoxy splash by a support means attached to the frame comprising adjustable fasteners that are rigidly affixed to the body of the epoxy splash. The epoxy splash is introduced into the window well of the automobile. Once positioned therein, a cementing means is applied to the adjustable fasteners to provide a fixation of the template apparatus. From the fixed template, additional tooling takes place to manufacture replacement windshields.

12 Claims, 2 Drawing Sheets

TEMPLATE APPARATUS AND METHOD FOR MANUFACTURING REPLACEMENT WINDSHIELDS

BACKGROUND

1. The Field of the Invention

This invention relates to a device employed in the manufacturing of precision glass pieces and, more particularly, to a novel template apparatus providing a useful means of creating replicas of previously manufactured windshields for precision fitting into automotive windshield frames.

2. The Background Art

Typically, a windshield is a necessary and required element for safely operating an automobile. Windshields are designed for the express purpose of keeping the elements of weather and the distractions of noise from disturbing automobile occupants. Windshields also provide protection for the automobile driver from flying debris and other harmful objects.

Unfortunately, damage to a windshield can occur in a variety of ways. For example, windshields can become damaged as a result of the elements of nature, such as hail or sleet. Frequently, windshields become chipped and cracked by rocks and debris thrown from the wheels of other vehicles. An automobile accident is another prevailing cause of damage to windshields. In some cases, a serious automobile accident can result in completely shattering the windshield. In any event, when a windshield becomes chipped, cracked or shattered, a replacement windshield may be inserted into the automobile frame to replace the original windshield and insure the continued safety of the automobile occupants.

When replacing a damaged windshield, the replacement windshield should be manufactured with precision and accuracy for a proper fitting within the specifically defined area of the windshield frame of the automobile. Traditionally, the automotive windshield replacement process may be conducted by simply making a copy or mold of an existing production windshield. The tooling and dies needed to design and create the replacement windshield are generally derived from the existing production windshield. However, this procedure has many disadvantages and drawbacks.

Typically, the methods of the prior art for manufacturing a mold for a replacement windshield involve the manufacturer renting or borrowing from an automobile dealership the particular make and model of the automobile needing the replacement windshield. The production windshield from the dealer automobile is removed from the car, packaged and sent to a glass manufacturing plant. While at the glass manufacturing plant, a master splash, a mold gauge, a glass gauge, and an oven mold template is created in hopes of generating a mold for the replacement windshield which is an exact duplicate of the production windshield. The generated mold for the production windshield may then be used to manufacture a new replacement windshield.

After the mold of the windshield is created, the production windshield may then be returned and reinstalled in the dealer car. Accordingly, these methods offered by the prior art when manufacturing a new replacement windshield from a production windshield generally requires an investment of approximately eight weeks turn-around time to complete. This extension of tooling time to manufacture a replacement windshield results in a significant disadvantage to the automobile owner if the vehicle is needed sooner.

Another disadvantage of the prior art methods for generating replacement windshields described above is evidenced by the fact that a majority of production windshields used as manufacturing "samples" comprise initial defects that frustrate a precision fitting of the windshield into the windshield groove of the replacement automobile. Whereby, these latent defects become incorporated into the final mold used to create the replacement windshield. Duplication of the production windshield's defects results in substandard windshields customarily being created by these traditional prior art processes.

In an effort to remove these latent imperfections, those skilled in the art attempt extensive retooling and remeasurements of the mold. However, to initiate such a process becomes expensive and time-consuming, while rarely producing successful replacements.

As illustrated by the number of prior patents and other disclosures, efforts are continuously being made in an attempt to remedy these disadvantages. One alternative prior art method used by windshield manufactures in hopes of creating a better original mold, involves the use of two different production windshields from two different automobiles. For example, the left side of one windshield and the right side of another windshield may be merged with the intent of creating a more perfect mold for the replacement windshield. However, these methods still transfer the latent defects of each of the original production windshields into the mold. Likewise, the merging of the two windshields often results in an increase of additional time and tooling costs. Thus, the merging of separate windshields has been found to be unsuccessful and inefficient when manufacturing replacement windshields.

From the foregoing, these customary practices offered by the prior art often results in producing a replacement windshield that does not fit the windshield groove of the automobile properly or securely. When this happens, often times the only alternative is to discard the replacement windshield. In addition to the problems of an inaccurate fit, a wide variety of cars must continually be leased or rented from car dealerships to procure the specific "sample" production windshield of the specific make or model of the vehicle. Consequently, these additional cost to manufacture a replacement windshield may ultimately raise its market price to the point that a replacement windshield becomes a very expensive solution to the windshield consumer.

Considering all these factors, the methods offered by the prior art have proven to involve a significant investment of time and manufacturing expenses, while creating substandard replacement windshields that are unable to accommodate safe and precision fittings within the automobile windshield frames, incurring further waste in the industry.

BRIEF SUMMARY AND OBJECTS OF THE INVENTION

In view of the foregoing, it is the primary object of the present invention to provide an apparatus and method for manufacturing replacement windshields which significantly reduces the turn-around time of manufacturing a replacement windshield.

It is also an object of the present invention to provide a method for creating an exact mold or template of a specifically designed replacement windshield quickly and efficiently.

Further, it is an object of the present invention to provide a means of manufacturing replacement windshields with the precise dimensions required for insertion into windshield frames of different makes and models of automobiles without transferring the latent defects of the production windshields.

Consistent with the foregoing objects, and in accordance with the invention as embodied and broadly described herein, a template apparatus and method is disclosed in one embodiment of the present invention as useful in the manufacturing of replacement automobile windshields. The present invention allows the user to create a template for the replacement windshield that follows the precise dimensions and contours of a windshield groove of a particular automobile or fixture.

The present invention provides a means by which the replacement windshield of many different types of vehicles can be more easily manufactured with a greater amount of accuracy and precision. Moreover, this invention is not intended to be limited only to manufacturing replacement windshields for automobiles, but may also be used whenever any replacement piece of glass requires a precision fit within a particularly defined area.

The preferred embodiment of the present invention entails a means for manufacturing an exact replica of an automobile windshield. First, the windshield manufacturer secures a replacement automobile, being of the same make and model of the automobile needing a windshield, from a car dealership. The car is then taken to the manufacturing warehouse where the production windshield is removed and an epoxy splash is applied to the windshield.

The epoxy splash is formed by applying layers of fiberglass fabric-strips around the outer six inches of the entire windshield while maintaining an open view through the center of the windshield. After three to four layers of fabric-strips have been applied, a 90 minute time period is allowed so that the layers can partially, but not totally cure. This process is repeated until ten to eighteen layers have been applied. The epoxy splash is then given time to completely cure. Even when fully cured, the epoxy splash remains slightly flexible and malleable. Whereby, the epoxy splash establishes a general outline of the production windshield.

The epoxy splash is then detached from the production windshield. A plurality of adjustment bolts are attached to the outside edges of the external surfaces of the epoxy splash by using an epoxy cement. The attachment bolts are then rigidly affixed to a rigid frame, which is used to support the body of the epoxy splash. The rigid frame may be made from epoxy tubing and metal support bars for structural integrity. The purpose of the adjustment bolts allow the epoxy splash to be tailored to the particular configuration of the window groove. Thus, the current invention simply uses the production windshield to create the basic profile of the window groove, and is not used to create the manufacturing mold.

The epoxy splash and rigid frame, together called the master splash, are then placed into the window well of the automobile. The master splash then conforms to the exact dimensions and contours of the windshield groove by the manipulation of the adjustment nuts attached to the adjustment bolts. Manipulating the adjustment nuts changes the shape of the pliable epoxy splash into the exact configuration of the windshield groove. Thus, a nearly perfect fit between the master splash and the windshield groove is established and a precise manufacturing mold may be created. An epoxy cement is applied to the adjustment nuts to prevent any further changes in the shape of the epoxy splash. This creates a permanent template of the actual windshield groove of the automobile.

The master splash is then removed from the window well of the automobile and the production windshield is replaced in the dealer automobile. The car is now ready to be returned to the automobile dealership. Whereas, this entire process takes approximately four days, rather than eight weeks required by the prior art.

The template is then delivered to the glass manufacturing plant where the template is used as a guide to construct an epoxy mold gauge, a metal mold, a cutting ring and a glass gauge by processes well known and used in the art. The metal mold, cutting ring and glass gauge are then used to manufacture the replacement windshield.

The process of manufacturing windshields from a template is described accordingly. First, the cutting ring is used to cut out the glass pieces from the glass sheets before they enter the manufacturing oven. The glass is then placed on the metal oven mold and heated in such a way that the glass then takes the shape of the mold. Finally, after the glass has been processed and cooled, the glass gauge is used to check the tolerances of the manufactured window.

A nearly perfect windshield is now available that precisely fits the window groove of the particular make and model of the automobile, and not simply a copy of a production window that incorporates the deficiencies of the production windshields.

The advantages to the replacement window manufacturer are numerous. The template provides the replacement windshield manufacturer a mold with the correct dimensions that precisely fits the windshield groove of the automobile. Because the frame of the present invention is readily adjustable and can be adapted to a wide variety of automotive makes and models, the template apparatus improves the quality and effectiveness of the final replacement windshield.

From the foregoing, this invention provides a practical approach which, during the inventor's experimentation, has resulted in significant and effective advancements over the known prior art. Most importantly, this new invention provides an apparatus and method that allows a high quality, precision-fitted windshield to be produced saving the manufacturer priceless time and expensive tooling costs. Whereby, none of the disclosures in the prior art suggest the present inventive system or combination of elements for replacement windshields as herein described and claimed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENT

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 2, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
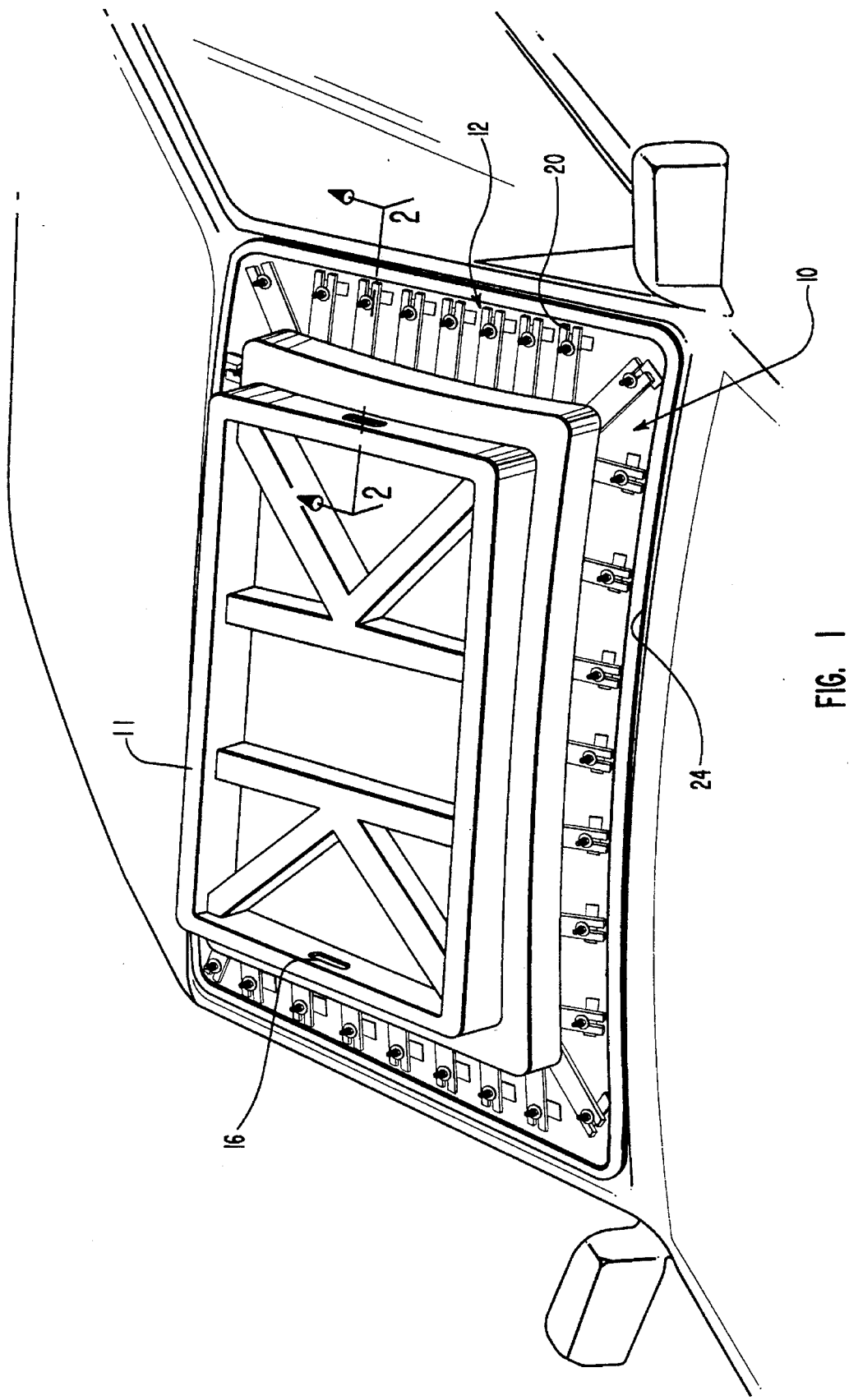
FIG. 1 is a perspective view illustrating one presently preferred embodiment showing the master splash template positioned within the window well of an automobile.
Figure 2:
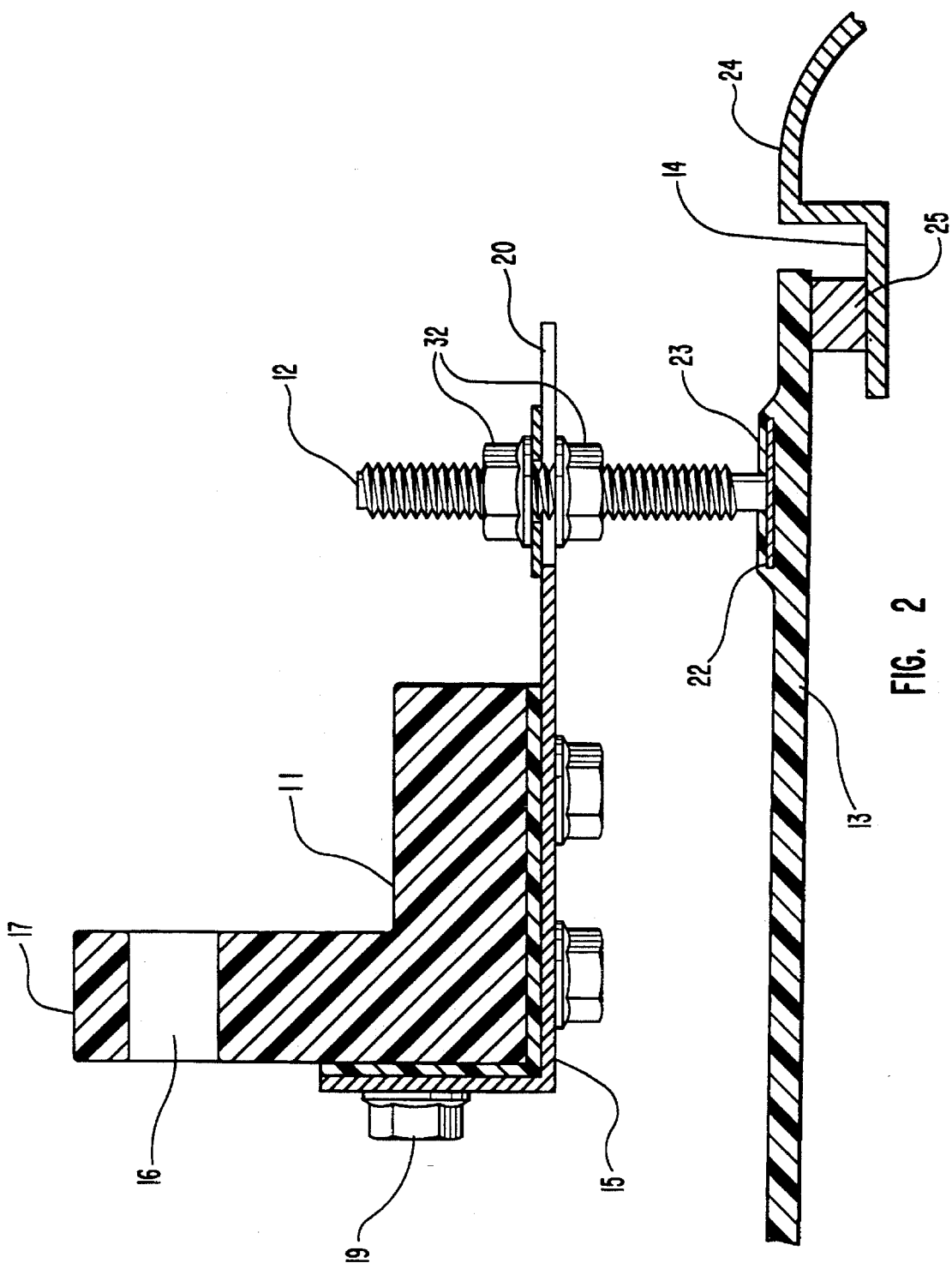
FIG. 2 is a vertical cross-sectional view of the embodiment of FIG. 1 taken along lines 2—2 of FIG. 1.

Referring to FIGS. 1 and 2, the preferred embodiment of the replacement windshield template apparatus 10 comprises a rigid frame 11 engaging an epoxy splash 13. The rigid frame 11, illustrated herein as being preferably comprised of epoxy tubing, may be composed of any other suitable material. Located within and on opposing sides of the epoxy tubing 17 of the rigid frame 11 are at least two hollow openings forming handles 16. These openings 16 provide a means by which the rigid frame 11 can be manipulated.

A joining means between the rigid frame 11 and the epoxy splash 13 is provided by a plurality of support bar extensions 15 extending substantially outward from the rigid frame 11. Preferably, the support bar extensions 15 are formed of stainless steel and configured in a substantially "L" shape. It will be readily appreciated, however, that other shapes and configurations are possible, as well as interchanging a variety of other suitable materials for the composition of the support bar extensions 15.

The first end of each support bar extension 15 may be affixed to the rigid frame 11 by a fastening means 19, such as an epoxy seeding and bolts. The preferred embodiment of the present invention illustrates the use of bolts 19 for assuring an unyielding connection between the rigid frame 11 and the support bar extensions 15, but is not intended to be restrictive thereby. Accordingly, the bolts 19 may be spirally threaded into the adjacent support bar extension 15 and further threaded into the corresponding epoxy tubing 17 for rigidly securing the support bar 15 and the epoxy tubing 17 together.

Each support bar extension 15 may also contain an elongated opening 20 on its second end. The elongated opening 20 provides a substantially linear slot in the second end of the support bar extension 15 providing a means whereby an adjustment bolt 12 may be situated therein. The body of said adjustment bolt 12 is preferably long enough in axial dimension to be interposed through the elongated opening 20 of the second end of the support bar extension 15 with its annularly enlarged, head 22 being exposed beneath the the support bar 15. The head 22 of the adjustment bolt 12 is positioned substantially downward abutting the inner portion of the epoxy splash 13. The preferred embodiment of the present invention illustrates the head portion 22 of the adjustment bolt 12 being substantially circular in shape. The head 22 of the adjustment bolt 12 also engages a substantially rectangular piece of cloth 23 which advances in width slightly beyond the width of the adjoining support bar extension 15. However, other shapes and configurations of the head 22 of the adjustment bolt 12 and the attached piece of cloth 23 are possible.

When the adjustment bolt 12 is situated within the elongated opening 20 of the support bar extension 15, the head 22 of the adjustment bolt 12 may be contiguously secured to the epoxy splash 13 by such means as an epoxy cement, or any other suitable conventional means. The epoxy cement is applied to the head 22 of the adjustment bolt 12 to affix the piece of cloth 23. Once the piece of cloth 23 is cemented to the head 22 of the adjustment bolt 12, the piece of cloth 23 may be securely fastened to the epoxy splash 13 by the epoxy cement, or some other conventional means.

Because the epoxy splash 13 remains slightly pliable and flexible, it is better able to be positioned within the windshield groove 14 of the automobile window well 24. When the adjustment bolts 12 are interposed within the elongated opening 20 on each support bar extension 15, the adjustment bolts 22 may be moved within the opening 20 by horizontal sliding. Accordingly, the adjustment bolts 12 may be interposed within the elongated opening 20 of the support bar extensions 15 anywhere within the linear length of the elongated opening 20.

After the adjustment bolt 12 is situated within the elongated opening 20 of the support bar extension 15 and the epoxy splash 13 is attached to the head 22 of the adjustment bolt 12 as discussed above, adjustment nuts 32 may be affixed to the adjustment bolt 12. The rotation of the adjustment nuts 32 relative to the adjustment bolt 12 facilitates the disposition of the epoxy splash 13 within the windshield groove 14 of the automobile. The substantially downward extension of the adjustment bolts 12 towards the epoxy splash 13 encourages the adaptation and conformation of the epoxy splash 13 within the longitudinal plane of the windshield groove 14. The adjustment bolt 12 and the adjustment nuts 32 interact in such a manner that the replacement windshield template 10 is positioned within the exact dimensions and contour of the windshield groove 14 confines of the automobile window well 24.

Before placement of the epoxy splash 13 into the windshield groove 14 of the automobile, a plurality of spacer blocks 25 are positioned within the window well 24 to assist in achieving an accurate measurement of the clearance area of the window well 24. The spacer blocks 25 are positioned to simulate the thickness of a rubber gasket sealant which may later be placed within the window well 24 before the replacement glass is finally installed.

Once the windshield template 10, comprising the rigid frame 11 and the epoxy splash 13, has been adjusted to a perfect fit within the windshield groove 14 of the window well 24, a fixing means, for example an epoxy cement, is applied to the adjustment nuts 32 to prevent further manipulation of the shape of the epoxy splash 13. Consequently, a permanent windshield template 10 for manufacturing replacement windshields for that particular make and model of automobile is created. All the necessary tooling for the replacement windshield is subsequently formed from the windshield template 10.

Consistent with the foregoing description, and in accordance with the invention as embodied and broadly described herein, it will be appreciated that the present invention provides a template apparatus and method for manufacturing replacement windshields which significantly reduces the turn-around time of manufacturing and installing a replacement windshield. Unlike the prior art, the present invention provides a quicker and more cost-effective means for manufacturing replacement windshields.

Additionally, the present invention provides a template apparatus and method for manufacturing replacement windshields that which produces precision-fit replacement windshields complying with the dimensions and contours of the windshield grooves of the automobile or other fixture. Thus, the present invention provides significant advantages over prior replacement windshield methods now in use.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A template apparatus for use in manufacturing a replacement glass piece, the apparatus comprising:

a rigid frame;

a flexible epoxy splash comprising epoxy impregnated fiberglass fabric strips in the general shape of the outer periphery of said replacement glass piece; and means for joining the rigid frame to the epoxy splash, said joining means comprising a plurality of support extensions extending substantially outward from said rigid frame, said support extensions having a first end fastened to said rigid frame and a second end having an elongated slot formed therein, said joining means including means for selectively adjusting the position of the epoxy splash relative to the rigid frame, said adjusting means slideably engaging said elongated slot and being adjustable substantially perpendicular relative thereto.

2. A template apparatus for use in manufacturing a replacement glass piece as defined in claim 1 further comprising means for simulating the thickness of a glass sealant.

3. A template apparatus for use in manufacturing a replacement glass piece as defined in claim 2 wherein said means for simulating the thickness of the glass sealant comprises a plurality of spacer blocks.

4. A template apparatus for use in manufacturing a replacement glass piece as defined in claim 1 wherein said glass piece comprises a windshield.

5. A template apparatus for use in manufacturing a replacement glass piece as defined in claim 1 wherein said rigid frame is formed of epoxy tubing.

6. A template apparatus for use in manufacturing a replacement glass piece as defined in claim 1 wherein said rigid frame comprises at least two hollow openings forming handles to provide means for manipulating the rigid frame.

7. A template apparatus for use in manufacturing a replacement glass piece as defined in claim 1 wherein said support extensions engaging a plurality of adjustment bolts removably attached to said epoxy splash for selectively positioning the epoxy splash relative to the rigid frame.

8. A template apparatus for use in manufacturing a replacement glass piece as defined in claim 7 wherein said adjustment bolt further comprises an adjustment nut rotatably introduced along a threaded body portion of said adjustment bolt, whereby interactive rotation of said adjustment nut relative to said threaded body portion of said adjustment bolt facilitates an introduction of said epoxy splash into a glass groove.

9. A template apparatus for use in manufacturing a replacement glass piece as defined in claim 7 wherein said support extensions are configured in a substantially L-shape.

10. A template apparatus for use in manufacturing a replacement glass piece as defined in claim 7 wherein said support extensions are formed of stainless steel.

11. A template apparatus for use in manufacturing a replacement glass piece as defined in claim 7 wherein said adjustment bolts comprise a substantially enlarged head and an elongated threaded body portion.

12. A template apparatus for use in manufacturing a replacement glass piece as defined in claim 11 wherein said enlarged head of said adjustment bolts is secured to a piece of material and removably attached to said epoxy splash by means of an adhesive.

* * * * *